United States Patent [19]
Heitritter et al.

[11] Patent Number: 5,824,355
[45] Date of Patent: Oct. 20, 1998

[54] METHOD FOR MANUFACTURING PROTEIN PROTECTED RUMINANT FEED

[75] Inventors: Glen V. Heitritter, Omaha; James B. Yeates, Fort Calhoun; Phillip L. Huffman, Omaha, all of Nebr.

[73] Assignee: Ag Processing, Inc., Omaha, Nebr.

[21] Appl. No.: 586,614

[22] Filed: Jan. 16, 1996

[51] Int. Cl.⁶ ........................................ A23L 1/20
[52] U.S. Cl. ................ 426/459; 426/465; 426/507; 426/630; 426/807
[58] Field of Search ................. 426/2, 459, 463, 426/465, 509, 523, 630, 635, 807

[56] References Cited

U.S. PATENT DOCUMENTS

| | | | |
|---|---|---|---|
| 2,295,643 | 9/1942 | Emery et al. | 426/74 |
| 3,463,858 | 8/1969 | Anderson | 514/494 |
| 3,619,200 | 11/1971 | Ferguson et al. | 426/2 |
| 3,971,856 | 7/1976 | Daftary | 426/459 |
| 4,172,072 | 10/1979 | Ashmead | 530/345 |
| 4,186,213 | 1/1980 | Burroughs et al. | 426/2 |
| 4,287,220 | 9/1981 | Pappas et al. | 426/630 |
| 4,664,905 | 5/1987 | Meyer | 426/2 |
| 4,664,917 | 5/1987 | Meyer | 426/2 |
| 4,704,287 | 11/1987 | Meyer | 426/74 |
| 4,737,365 | 4/1988 | Meyer | 426/2 |

OTHER PUBLICATIONS

H. Tagari et al., Brit J. Nutr. 16, pp. 237–243 (1962).
L. Hudson et al., Ruminal and Postruminal Nitrogen by Lambs Fed Heated Soybean Meal, pp. 609–613.
T. Klopfenstein, Feedstuffs, pp. 23–24 (Jul. 20, 1981).

*Primary Examiner*—Matthew O. Savage
*Attorney, Agent, or Firm*—McDonnell Boehnen Hulbert & Berghoff

[57] ABSTRACT

This invention encompasses protein-protected ruminant feed comprising oil seed meal, hulls, and water that has been cooked to give a cooked meal having a temperature of at least 200° F. and a moisture content of from 21 to 26 wt. % and thereafter drying and cooling the moist cooked feed to give a protein protected ruminant feed. The protein protected ruminant feed is less digestible in the rumen and thereby enhances ruminant growth and milk production.

9 Claims, 1 Drawing Sheet

METHOD FOR MANUFACTURING PROTEIN PROTECTED RUMINANT FEED

BACKGROUND OF THE INVENTION

1. Field of the Invention

This invention concerns improving protein utilization by cattle. More particularly, the invention relates to a method of manufacturing a ruminant feed that, when consumed, provides a larger amount of nourishment to the lower gut of animals than previously known ruminant feeds. This invention is also a novel ruminant feed.

2. Description of the Art

It has been recognized for some time that protein-providing feed materials which are subject to digestion in the rumen are thereby downgraded with respect to the feeding value of the protein. It has been proposed that the protein component of the ruminant feed should be "protected" against being solubilized or metabolized in the rumen so that they may pass therethrough in substantially undegraded form, while remaining digestible and metabolizable in the post-rumen digestive system of the cattle or sheep. The development of a practical way for applying this concept to ruminate nutrition has proven difficult.

U.S. Pat. No. 3,619,200 proposes the application to vegetable meal or other proteinaceous ruminant feed material of a rumen resistant coating. The purpose of the coating is to protect the proteinaceous feed from microbial attack in the rumen while decomposing and permitting digestion of the feed within the abomasum and small intestine. It is also known that the solubility of protein in ruminant feed materials can be reduced by treating the feed materials with tannin, formaldehyde, or other aldehydes. In addition, a reduction in protein solubility can be obtained by heating the protein. These procedures are summarized with literature references thereto in U.S. Pat. No. 4,186,213. Feed materials which may be treated by one or more of these procedures to reduce the solubility of the protein in the rumen and to protect against rumen destruction include particularly soybean meal and other oil seed meals.

With reference to feeding value lost by rumen destruction, soybean meal has a relatively low protein efficiency value. See Klopfenstein, Feedstuffs, July, 1981, 23–24. Since soybean meal is one of the major protein-containing feed materials used with cattle, it is particularly desirable to provide a commercially practical means for protecting soybean meal against rumen destruction while leaving the protein thereof subject to post-rumen digestion and metabolism. For large scale commercial use such a method must be simple, efficient, and of relatively low cost.

One simple method of protecting animal feed against rumen destruction is incorporating zinc compounds into the feeds as described in U.S. Pat. Nos. 4,737,365, 4,704,287, 4,664,917, and 4,664,905. The four patents disclose zinc containing ruminant feeds and methods for administering that reduce rumen feed destruction.

Other prior art references of interest are Hudson et al. (1970), J. Anim. Sci., 30:609–613; Tagari et al. (1962), Brit. J. Nutr., 16:237–243; Anderson U.S. Pat. No. 3,463,858 (1969); Emery et al. U.S. Pat. No. 2,295,643 (1942); and Ashmead U.S. Pat. No. 4,172,072 (1979).

Hudson et al. describe an experimental comparison in lambs of post ruminal nitrogen utilization of commercial soybean meal (72% N soluble) with meal heated 4 hours at 140° C. (35% N soluble). The results suggest that the heated meal was degraded at a slower rate by ruminal microorganism.

Tagari et al. compared solvent extracted soybean meals of different heat exposures. These included room temperature solvent removal, solvent removal at 80° C. for 10 minutes, and commercial toasted meal steamed at 120° C. for 15 minutes. The meals were fed to rams and rumen liquor samples were tested. Artificial rumen comparisons for ammonia liberation were also made. It was concluded that the main factor determining the different efficiencies of process to non-process soybean meals is their different solubility in rumen liquor. It was also observed that changes in solubility caused by different heat treatments of soybean meal are relatively large in comparison with other meals.

Anderson discloses a procedure for preparing a growth factor for feeding domestic animals and poultry. A zinc salt in aqueous solution such as zinc chloride or zinc sulfate is reacted with free amino acids in a proteinaceous feed material. The reaction is carried out in an aqueous solution at a temperature of 60°–70° C. (140°–158° F.) and a pH of 3.5, which pH is said to be achieved automatically with $ZnCl_2$, an adjustment of pH with HCl being used with other zinc salts. The reaction mixture is dried to a moisture content of 2–8%, and mixed with the feed ration. There is no reference to the feeding of ruminants, or to rumen protection of protein.

Emery et al. describes a process in which mineral compounds including zinc and other polyvalent metal oxides, hydroxides, and salts are reacted with proteinaceous feed materials in the presence of water and a protein splitting acid such as $H_2PO_4$, HCl, or $H_2SO_4$. The reacted mixture is dried by heating in air. Soybean meal is indicated as the preferred feed material and zinc is among the metals referred to for use in the form of oxides, hydroxides, or carbonates. Other salts, such as cobalt, are indicated as being used in the form of chlorides or sulfates. The examples illustrate the reaction of large amounts of the metal compounds with soybean meal (Ex. I, 35% and Ex. III, 17%, based on the meal). There is no reference in this patent to either rumen protection or nutritional value.

Ashmead proposes the use of metal proteinates for supplying mineral deficiencies in humans and animals. The proteinates are prepared by reacting bivalent metal salts at an alkaline pH with free amino acids of enzyme-hydrolyzed proteins.

SUMMARY OF THE INVENTION

It is an object of this invention to provide a method for manufacturing ruminant feeds that are not easily destroyed in the rumen.

It is another object of this invention to provide a method for manufacturing ruminant feeds that deliver a large amount of nutrition to the post-rumen digestive system of animals.

It is yet another object of this invention to provide a novel ruminant feed that, when consumed by lactating cows, increases their milk production.

It is still another object of this invention to provide a novel ruminant feed that accelerates the weight gain of animals that eat the feed.

It is a further object of this invention to provide a protein protected ruminant feed that contains no chemical additives.

In one embodiment, this invention is a process for manufacturing a cooked protein protected ruminant feed. The process comprises the steps of mixing oil seed meal with hulls to give a combined feed solids mixture having a hull/oil seed meal weight ratio of from about 1:100 to about 10:100. Water is next added to the combined feed solids mixture in an amount ranging from about 30 to about 50 wt. % of the oil seed meal in the combined feed solids mixture to give a moist meal feed. The moist meal feed is then cooked in a cooker for a period of time sufficient to give a moist cooked meal having a temperature of at least 200° F. and a moisture content based on the amount of oil seed meal in the combined feed solids mixture of from about 21 to about 26 wt. %. The moist cooked meal is then dried in a dryer at conditions of temperature and time sufficient to give a dried meal having a moisture content based upon the amount of oil seed meal used in the combined feed solids mixture of from about 12 to about 16 wt. %. Finally, the dried meal is cooled in a cooler to give a protein protected ruminant feed having a temperature less than 25° F. above ambient temperature.

In another embodiment, this invention is a cooked protein protected ruminant feed comprising from about 90 to about 99 wt. % oil seed meal, from about 1 to about 10 wt. % hulls, and a moisture content of from about 12 to about 15 wt % based on the weight of oil seed meal. The cooked protein protected ruminant feed has unique properties including a ruminantly undegradable protein value greater than 69 percent of CP, and/or a digestible amino acid content that is at least 150% of uncooked soybean meal.

In still another embodiment, this invention is a method for improving milk production from a lactating cow. The method comprised feeding the lactating cow a cooked protein protected ruminant feed having a oil seed meal content of from about 90 to about 99 wt. %, a hull content of from about 1 to about 10 wt. %, and a moisture content of from about 12 to about 15 wt % based on the weight of oil seed meal.

DESCRIPTION OF THE FIGURE

There is shown in FIG. 1 a presently preferred embodiment of a process for manufacturing a protein protected ruminant feed of this invention.

DESCRIPTION OF THE CURRENT EMBODIMENT

Figure 1:
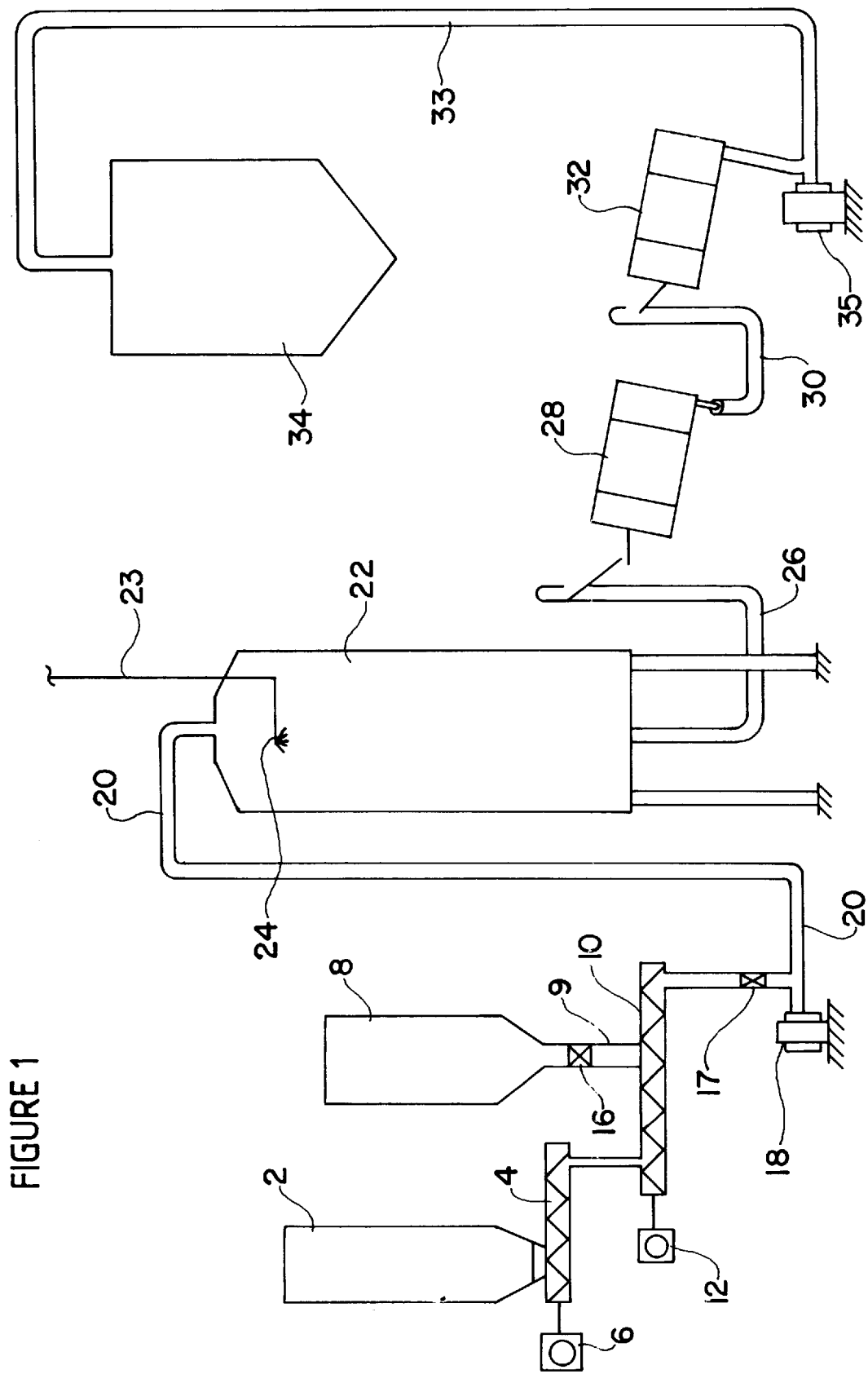

The present invention relates to process for manufacturing a protein protected ruminant feed as well as a novel protein protected ruminant feed.

The process of this invention requires a feed comprising oil seed meal, hulls, and water and converts the combined moist meal feed into a protein protected ruminant feed. The oil seed meal may be any type of proteinaceous ruminant feed meal such a soybean meal, corn meal, oats, wheat, barley, and so forth. It is preferred that the oil seed meal is soybean meal due to its high protein content.

The hulls that are combined with the oil seed meal may be the hulls derived from any of the meal sources identified above with soybean hulls being preferred. The purpose of adding hulls to the moist meal feed is to obtain a proper fiber/protein feed balance. The oil seed meal is combined with the hulls at a hull/oil seed meal weight ratio ranging from about 1:100 to about 10:100. A preferred hull/oil seed meal weight ratio range is from about 3:100 to about 6:100.

Water is added to the hull/oil seed meal mixture to give a moist meal feed that has a moisture content ranging from about 30 wt. % to about 50 wt. % based upon the weight of oil seed meal in the oil seed meal/hull mixture. The preferred moisture content of the moist meal feed is about 33 wt. % to about 40 wt. % based upon the weight of oil seed meal in the oil seed meal/hull mixture.

The preparation of the moist meal feed is preferably an automated process. The automation assures that the appropriate ratio of hulls and water to oil seed meal are maintained at all times. The oil seed meal flow is preset to control the feed rate in pounds per minute or any other appropriate feed flow rate measure. The hull flow rate is set at a percentage of the oil seed meal feed rate. Typically, the oil seed meal and the hulls will be combined and mixed together in a solids mixer such as a paddle mixer, a tumbler, a ribbon mixer, a screw conveyor, a muller, or any other type of solid/solid mixer known in the art for a short period of time to thoroughly combine the solid ingredients. The combined solid ingredients are then conveyed to cooker where the combined feed solids mixture is sprayed with water to achieve the desired moisture level of the moist mixed feed.

Water may be added to the feed solids to achieve the desired moist meal feed moisture level in any manner known in the art. Water may be added to the feed solids in a mixer, water may be sprayed directly onto the combined feed solids, water may be injected into a screw conveyor conveying the combined feed solids, and so forth. It is preferred that water is sprayed evenly on the combined feed solids to give a moist meal feed just before the moist meal feed is cooked.

The moist meal feed is next cooked. The cooking may be accomplished in any cooker known in the art for cooking animal feeds. Examples of feed cookers useful for cooking the moist meal feed include rotary steamed tube cookers, stacked cookers, fluid bed cookers, and scraped cookers. It is preferred that the moist meal feed cooker is a stacked feed cooker having a plurality of heated decks, each heated deck including at least one sweep arm to agitate the moist meal feed to prevent overcooking and burning and to encourage evaporation of some water from the moist meal feed during the cooking step.

The moist meal feed is cooked in the cooker for a period of time sufficient to raise the temperature of the moist meal feed to at least 200° F. and to lower the moist meal feed moisture content to from about 20–25 wt. % based on the weight of oil seed meal in the mixture to give a moist cooked feed. This means that the cooker will generally operate at temperatures ranging from about 150° to about 220° F; or those temperatures designed to prevent overcooking and/or burning to the moist meal feed in the cooker.

The high moisture, high temperature cooked feed exiting the cooker is conveyed to a dryer. The dryer may be any type of dryer known in the art to be capable of drying animal feeds. Examples of dryers useful in the process of this invention include tray dryers, vacuum shelf dryers, continuous tunnel dryers, and indirect and direct rotating dryers. A preferred dryer is a rotary dryer. The moist cooked feed is conveyed to and dried in dryer at a temperature, and for a period of time sufficient to reduce the moisture of the cooked feed to from about 12 to about 16 wt. %, and preferably to from about 13–14 wt. %—based on the weight of oil seed meal feed rate. Thus, the dryer temperature will range from about 100° to about 150° F. during the drying step, and the drying step will typically continue for from 15 minutes to about 2 hours or more. The rotational speed of the preferred rotating dryer can be varied to control the residence time of the moist cooked feed in the rotary dryer and thereby control the moisture content of the resulting dried feed. The excess moisture in the moist cooked feed that is removed in the dryer is typically vented to the atmosphere.

The dried feed leaving the dryer is then conveyed to a feed cooler where the still hot dried feed is cooled to close to ambient temperature. Any device known in the art for mixing and cooling animal feeds may be used to cool the dried feed. An especially useful cooler is a rotary cooler. The still hot, dried feed is cooled in the rotary cooler until the dried feed reaches a temperature of no more than 25° F. above ambient temperature, and preferably no more than 15° F. above ambient temperature. During the cooling step, the moisture content of the dried feed will drop an additional 0.5 to about 2 wt % from the moisture level of the dried feed exiting the drier.

The cooled protein protected ruminant feed product is then conveyed to a product bin where it can be shipped via truck, train, or any other means for sale and use.

The following Table I details important parameters of the protein protected ruminant feed production processes of this invention.

TABLE I

| Feed Components | |
| --- | --- |
| High Protein Meal | 100 parts |
| Hulls | 2–6 parts |
| Water. | 30–40% of HiPro Meal |
| Cooker Parameters | |
| Inlet Temp. | 160° F. min. |
| Outlet Temp. | 200° F. min. |
| Outlet Feed Moisture | 21 wt % min./26 wt. % max. |
| Cooler Parameters | |
| Discharge Moisture | 12–15 wt. % |
| Color | Chocolate Brown |
| Smell | Sweet/Molasses |
| Appearance | Uniform - No Black Specs |

A preferred process for manufacturing protein protected ruminant feeds is shown in FIG. 1. High protein oil meal feed is fed from oil meal feed hopper 2 into first conveyor 4. First conveyor 4 may be any type of conveyor capable of conveying solids such as a screw feeder or a conveyor belt. First conveyor 4 is driven by first feed conveyor driver 6 and the high protein feed is directed by first conveyor 4 into a second feed conveyor 10. A hull hopper 8 is associated with second feed conveyor 10 by conduit 9. A first airlock 16 in conduit 9 is used to control the rate of addition of hulls to the oil seed meal. Second feed conveyor 10 may be any type of conveyor useful for conveying solids such a screw drives and conveyor belts. It is preferred that second feed conveyor 10 is a screw conveyor that is capable of mixing the hulls and the oil seed meal that is conveyed by second feed conveyor 10. A second feed conveyor driver 12 is used to drive second feed conveyor 10.

The oil seed meal/hull mixture, combined and mixed by second feed conveyor 10, is directed to cooker 22 by directing a controlled amount of the mixture into second airlock 17. Second airlock 17 is then actuated and the controlled amount of feed mixture is directed into a pneumatic conduit 20 where first blower 18 forces the mixture through pneumatic conduit 20 and into feed cooker 22. Water from a water header 23 is directed into feed cooker 22 at a controlled rate and sprayed evenly over the oil seed meal/hull mixture with water sprayer 24 to give a moist feed mixture having a moisture content of from about 30 to about 50 wt. % of the oil seed meal content of the oil seed meal/hull mixture.

Feed cooker 22 is operated with a minimum inlet temperature of 160° F. The moist mixed feed is kept in feed cooker 22 to give a moist cooked feed. The moist cooked feed exiting feed cooker 22 will have a minimum temperature of 200° F. and a moisture content of from 21–26 wt. % and preferably a moisture content of from 23–25 wt %.

Moist cooked feed exits cooker 22 where it is conveyed to dryer 28 by a first drag conveyor 26. Dryer 28 is preferable a rotary drier that is operated at a temperature ranging from about 100° to about 150° F. The moist cooked feed is dried in dryer 28 for a period of time ranging from about 10 minutes to about 2 hours or more until the moisture content of the dried feed ranges from about 12 wt. % to about 16 wt. %—based upon the oil meal feed content of the oil feed meal/hull mixture—whereupon the dried cooked feed is directed to a dried feed cooler 32 by second drag conveyor 30.

Dried feed cooler 32 is preferably a rotary cooler and the dried feed is cooled in cooler 32 until the temperature of the dried feed drops to at least below 25° F. above the ambient temperature and preferably below at least 15° F. above the ambient temperature. While in dried feed cooler 32, additional moisture evaporates from the dried feed so that the resulting protein protected ruminant feed exiting dried feed cooler 32 has a moisture content of from 10–13 wt % and preferably a moisture content of from about 12 to about 12.5 wt. %—based on the oil meal feed content of the oil meal feed/hull mixture.

The cooled protein protected ruminant feed is directed to product hopper 34 via pneumatic conduit 33 associated with second blower 35 where the protein protected ruminant feed is stored for shipping and/or use. The resulting protein protected ruminant feed produced by the process of this invention will have a oil meal feed content of from about 90 to about 99 wt %, a hull content of from about 1 to about 10 wt. %, and a moisture content of from about 12 to about 15 wt. % based upon the oil seed meal feed weight.

EXAMPLES

In the following examples, the values for RUP (ruminantly undegraded protein) were calculated and presented as follows:

% RUP=100−[(% of original protein which is available−% of original protein digested in the rumen)/% of original protein available]

The amount of original feed protein digested in the rumen was measured after incubation in the rumen of dairy cows at various timed intervals as described in detail below. Similar methods of calculation were used to measure the effect of the protein protected ruminant feed of this invention on bypass of amino acid content of feeds.

The extent to which bypass protein is available in the lower gut after escaping destruction in the rumen is important for nourishment of the animal. A useful evaluation method for measuring digestibility of bypass protein is that of enzyme indigestibility as shown by measuring extent of in vitro protein degradation by proteases. Suitable test procedures are described in the following reference—Calsamiglia and Stern, *A Three-Step Procedure for Estimating Intestinal Digestion of Protein in Ruminants*, J. Animal Sci., 73, 1459 (1995). The in vitro enzyme procedure closely simulates digestion of bypass protein in the in vitro culture, the greater the availability of the protein to digestive enzymes found in the abomasum and intestines of ruminants.

The effects of the protein protected ruminant feed of this invention on the RUP and bypass amino acid content of feeds, the digestibility of bypass protein in the lower gut, and the use of protein-protected feeds in feeding ruminants, is illustrated by the following examples.

Example I

The experiment reported below in Table II shows the potential of the invention for rumen bypass protection of high-protein vegetable meals specifically toasted soybean meal. A single lot of soybean meal (SBM; defatted and toasted) was used. A portion of the lot was retained as a control. The remainder was treated by adding approximately 4 wt. % hulls to the soybean meal based upon the weight of the soybean meal and mixing the soybean meal and hulls in a 24" paddle mixer for about one minute to give mixed feed solids. The mixed feed solids were then conveyed to a 120" diameter stacked feed cooker where the mixed feed solids were sprayed with water to give a moist mixed solids feed having a moisture content of 34 wt. % of the soybean meal weight.

The moist mixed feed solids were cooked in the stacked feed cooker for 2 hours and 45 minutes. The stacked feed cooker used included six decks, each deck equipped with a single sweep arm to agitate the moist mixed feed solids to keep them from burning. The temperature of the moist mixed feed solids was allowed to rise slowly in the top two decks of the stacked feed cooker prior to reaching the necessary cooking temperature minimum of 200° F. The moist cooked feed exiting the stacked feed cooker had a temperature of 200° F. and a moisture content of 21 wt. %.

The moist cooked feed was then directed to an 8'×40' rotary dryer operating at 0.33 rpm, and at a dryer temperature of 125° F. The moist cooked feed was retained in the rotary drier for 1 hour until the cooked feed had a moisture content of about 13.5 wt. %.

The hot dried cooked product was then directed into a 8'×40' rotary cooler where air was negatively drawn concurrent to the product flow to remove heat and from about 1 to 1.5 wt. % of the moisture remaining in the dried cooked feed. The cooled cooked feed was withdrawn from the rotary cooler at a temperature 15° F. above the ambient temperature. The cooled ruminant feed had a moisture content of 12.5 wt. %.

Samples of the control and treated soybean meal were evaluated for potential rumen bypass properties by the in situ dacron bag method used to measure RUP as described earlier. Samples were incubated in the rumens of young dairy steers for 16 hours. The potential lower gut digestibility of protein residue remaining after rumen incubation was evaluated by in vitro procedures as described above. Results are shown in the table.

TABLE II

| Feed Treatment | CP % | RUP, % of CP | Intestinal digestibility of RUP, % | Digestible RUP, % of CP[1] | Digestible RUP, % of Control |
|---|---|---|---|---|---|
| Control SBM | 49.1 | 25.6 | 71.2 | 18.2 | — |
| Treated SBM | 47.2 | 69.9 | 86.9 | 60.7 | 233.5 |

[1]Calculated as RUP (% of Crude Protein "CP") multiplied by intestinal digestibility of RUP (%).

Example II

Another in situ dacron bag trial was conducted. In this case, the effect of said invention on the rumen bypass of digestible amino acids was evaluated. The procedures used were those described in EXAMPLE I except that control and treated soybean meal samples were incubated in the rumens of lactating dairy cows for 16 hours. The concentration of amino acids in the lower gut were measured. The results are summarized below in Table III. The results as reported in Table III show that for the protein protected ruminant feed of this invention ("treated SBM"), individual digestible amino acid supply is 134.7 to 167.5% of control soybean meal ("SBM") with a mean increase in total supply of digestible bypass amino acids of 150.7%.

TABLE III

| Digestible Bypass Amino Acid, g/kg as fed | Control SBM | Treated SBM | % of Control SBM |
|---|---|---|---|
| Arginine | 10.3 | 16.1 | 156.3 |
| Histidine | 4.1 | 6.4 | 156.1 |
| Isoleucine | 8.4 | 12.2 | 145.2 |
| Leucine | 13.4 | 20.1 | 150.0 |
| Lysine | 8.9 | 12.8 | 143.8 |
| Methionine | 2.8 | 3.8 | 135.7 |
| Phenylalanine | 8.9 | 12.6 | 141.6 |
| Threonine | 6.9 | 10.0 | 144.9 |
| Tryptophan | 2.2 | 3.6 | 163.6 |
| Valine | 8.8 | 12.5 | 142.0 |
| Alanine | 9.1 | 11.4 | 140.7 |
| Aspartic acid | 16.2 | 25.6 | 158.0 |
| Cystine | 2.3 | 3.1 | 134.7 |
| Glutamic acid | 24.3 | 40.7 | 167.5 |
| Glycine | 7.5 | 10.6 | 141.3 |
| Serine | 8.4 | 12.7 | 151.1 |
| Tyrosine | 6.7 | 9.4 | 140.3 |
| Total amino acids | 148.1 | 223.3 | 150.7 |

Example III

A lactation trial was conducted to study the effect of feeding treated SBM compared with untreated SBM or corn gluten meal as sources of supplemental protein to high producing cows. Corn gluten meal was fed because it has an inherently high amount of bypass protein. A total of 16 Holstein dairy cows in early lactation were used in a randomized block design experiment having a Latin square arrangement of treatments. The trial was divided into four periods with three weeks in each period. All cows received each of the test diets in different periods of the study.

The diets consisted of total mixed rations containing corn silage, alfalfa haylage and hay, cereal concentrate, and protein supplement. Supplemental protein was supplied by untreated SBM, corn gluten meal, treated SBM, or treated SBM plus crystalline methionine that had been protected from destruction in the rumen by encapsulation (Protected Met). Feed intake, milk production, and composition of milk were measured. The results of the test are summarized in Table IV.

This test showed that increasing the bypass protein content of diets by feeding treated SBM or corn gluten meal compared with control SBM improved milk production by six to eight pounds per day. Feeding the protected methionine product with treated SBM increased milk fat percentage and milk protein percentage compared with feeding only treated SBM. Taken as a whole, these data support the use of treated SBM as a source of rumen bypass protein for increased lactation performance by high producing dairy cows.

TABLE IV

| Item | Control SBM | Treated SBM | Corn Gluten Meal | Treated SBM + Protected Met |
|---|---|---|---|---|
| Feed dry matter intake, lb/d | 45.2 | 47.9 | 47.7 | 48.6 |
| Milk, lb/d | 73.7 | 81.9 | 79.9 | 79.7 |
| Milk fat, % | 3.36 | 3.26 | 3.41 | 3.47 |
| Milk protein, % | 3.13 | 3.09 | 3.12 | 3.14 |
| 4% Fat Corrected Milk; lb/d | 66.4 | 72.5 | 73.1 | 73.2 |

Example IV

To further evaluate the benefits of the treatment of this invention, a field study involving lactating dairy cows in nine different herds was conducted. In these studies, a method of testing was employed whereby cows received a control diet without treated SBM for a period of 30 days, and then received a diet containing the treated SBM during the next two-30 day periods. Yield of milk and composition of milk were recorded during each period of the test. Because milk yield naturally declines with advancing lactation, the data were adjusted to a constant days in milk according to the following formula:

*Adjusted milk*=(0.432\**lbs of milk*)+(16.23\**lb milk*\*)% *fat*/100)+ [(*herd average days in milk*–150)\*0.0029\**lbs of milk*].

The percentages of milk fat and milk protein were not affected by feeding treated SBM. The effects of treated SBM on milk yield are summarized in Table V.

TABLE V

| Herd Number | Control Diet Milk Production, lb/d | Treated SBM Diet Milk Production, lb/d[2] | % Improvement Over Control |
|---|---|---|---|
| 1 | 69.8 | 80.7 | 15.6 |
| 2 | 74.6 | 83.7 | 12.2 |
| 3 | 70.1 | 78.7 | 12.2 |
| 4 | 66.2 | 71.4 | 7.9 |
| 5 | 69.1 | 73.7 | 6.8 |
| 6 | 75.8 | 74.5 | (1.7) |
| 7 | 72.9 | 76.2 | 4.6 |
| 8 | 71.4 | 76.9 | 7.7 |
| 9 | 64.2 | 65.9 | 2.6 |
| Average | 70.5 | 75.8 | 7.5 |

[2]Results are the average milk production by cows during periods two and three of the test.

The results of this field test show that feeding treated SBM to cows can improve milk production by an average of 7.5%. This occurs because diets containing treated SBM provide more protein and amino acid nourishment to the animal.

The description above has been offered for illustrative purposes only, and it is not intended to limit the scope of the invention of this application which is defined in the following claims.

What we claim is:

1. A process for manufacturing a cooked protein protected ruminant feed comprising the steps;
   (a) mixing oil seed meal with hulls to give a combined feed solids mixture having a hull/oil seed meal weight ratio of from about 1:100 to about 10:100;
   (b) adding water to the combined feed solids mixture in an amount ranging from about 30 to about 50 wt. % of the oil seed meal weight in the combined feed solids mixture to give a moist meal feed;
   (c) cooking the moist meal feed in a cooker for a period of time sufficient to give a moist cooked meal having a temperature of at least 200° F. and a moisture content based on the weight of oil seed meal in the combined feed solids mixture of from about 21 to about 26 wt. %;
   (d) drying the moist cooked meal in a dryer at conditions of temperature and time sufficient to give a dried meal having a moisture content based upon the weight of oil seed meal used in the combined feed solids mixture of from about 12 to about 16 wt. %; and
   (e) cooling the dried meal in a cooler to give a protein protected ruminant feed having a temperature less than 25° F. above ambient temperature.

2. The process of claim 1 wherein the cooker is a stacked cooker.

3. The process of claim 1 wherein the dryer is a rotary dryer.

4. The process of claim 1 wherein the cooler is a rotary drum cooler.

5. The process of claim 1 wherein the oil seed meal is soybean meal.

6. The process of claim 1 wherein the hulls are soybean hulls.

7. The process of claim 6 wherein the soybean hull/soybean meal weight ratio in the combined solids feed mixture is from about 3:100 to about 6:100.

8. The process of claim 1 wherein the moisture content of the moist meal feed is from about 33 to about 40 wt. % of the oil seed meal weight in the combined feed solids mixture.

9. A process for manufacturing a cooked protein protected ruminant feed comprising the steps;
   (a) mixing soybean meal with soybean hulls to give a combined feed solids mixture having a soybean hull/soybean meal weight ratio of from about 3:100 to about 6:100;
   (b) adding water to the combined feed solids mixture in an amount ranging from about 33 to about 40 wt. % of the weight of soybean meal in the combined feed solids mixture to give a moist meal feed;
   (c) cooking the moist meal feed in a stacked cooker for a period of time sufficient to give a moist cooked meal having a temperature of at least 200° F. and a moisture content based on the weight of soybean meal in the combined feed solids mixture of from about 21 to about 26 wt. %;
   (d) drying the moist cooked meal in a rotating drum dryer at from about 100° to about 150° F. for a period of time sufficient to give a dried meal having a moisture content based upon the weight of soybean meal used in the combined feed solids mixture of from about 12 to about 16 wt. %; and
   (e) cooling the dried meal in a cooler to give a protein protected ruminant feed having a temperature less than 15° F. above ambient temperature and having a moisture content of from about 12 to about 15 wt. % of the weight of soybean meal in the combined feed solids mixture.

\* \* \* \* \*